(12) United States Patent
Reiling

(10) Patent No.: US 11,110,902 B2
(45) Date of Patent: Sep. 7, 2021

(54) SETTING A TORQUE DISTRIBUTION BETWEEN WHEELS OF AN AXLE OF A MOTOR VEHICLE BY ACTUATION OF AN OPERATOR CONTROL UNIT

(71) Applicant: AUDI AG, Ingolstadt (DE)

(72) Inventor: Jaan Mattes Reiling, Sassenberg (DE)

(73) Assignee: AUDI AG, Ingolstadt (DE)

( * ) Notice: Subject to any disclaimer, the term of this patent is extended or adjusted under 35 U.S.C. 154(b) by 172 days.

(21) Appl. No.: 16/488,316

(22) PCT Filed: Feb. 12, 2018

(86) PCT No.: PCT/EP2018/053446
§ 371 (c)(1),
(2) Date: Aug. 23, 2019

(87) PCT Pub. No.: WO2018/158068
PCT Pub. Date: Sep. 7, 2018

(65) Prior Publication Data
US 2019/0375385 A1 Dec. 12, 2019

(30) Foreign Application Priority Data
Mar. 1, 2017 (DE) ..................... 10 2017 203 362.2

(51) Int. Cl.
*B60T 8/1755* (2006.01)
*B60W 10/16* (2012.01)
(Continued)

(52) U.S. Cl.
CPC ........... *B60T 8/1755* (2013.01); *B60W 10/16* (2013.01); *B60T 2220/02* (2013.01);
(Continued)

(58) Field of Classification Search
CPC .. B60T 8/1755; B60T 2220/02; B60W 10/16; B60W 10/184; B60W 30/045; B60W 30/18145; B60W 2720/406
See application file for complete search history.

(56) References Cited

U.S. PATENT DOCUMENTS 5,301,768 A * 4/1994 Ishikawa ............... B60T 8/1769
180/249
6,219,609 B1 * 4/2001 Matsuno ............... B60T 8/1755
303/140
(Continued)

FOREIGN PATENT DOCUMENTS

| DE | 102007002709 A1 | 7/2008 |
|---|---|---|
| DE | 102010001068 A1 | 7/2011 |

(Continued)

OTHER PUBLICATIONS

German Examination Report dated Oct. 19, 2017 in corresponding German Application No. 10 2017 203 362.2; 12 pages.
(Continued)

*Primary Examiner* — Russell Frejd
(74) *Attorney, Agent, or Firm* — Maier & Maier, PLLC

(57) ABSTRACT

A method for operating a motor vehicle, in which an active manipulation of the yaw angle of the motor vehicle is performed, in that, on a left wheel and on a right wheel of at least one axle of the motor vehicle, an uneven torque distribution is set. In order to give the driver better control of the torque distribution to the wheels of the motor vehicle, an actuation of an operator control unit of the motor vehicle is detected; the uneven torque distribution is set in a manner dependent on the detected actuation; the uneven torque distribution is maintained only as long as the actuation of the operator control unit is detected.

20 Claims, 1 Drawing Sheet

(51) Int. Cl.
*B60W 10/184* (2012.01)
*B60W 30/045* (2012.01)
*B60W 30/18* (2012.01)

(52) U.S. Cl.
CPC ......... *B60W 10/184* (2013.01); *B60W 30/045* (2013.01); *B60W 30/18145* (2013.01); *B60W 2720/406* (2013.01)

(56) References Cited

U.S. PATENT DOCUMENTS

| | | | | |
|---|---|---|---|---|
| 2004/0026148 | A1* | 2/2004 | Matsuno | B60K 23/0808 180/248 |
| 2004/0059494 | A1* | 3/2004 | Yoneda | B60K 23/04 701/89 |
| 2008/0084110 | A1 | 4/2008 | Suzuki et al. | |
| 2010/0234162 | A1* | 9/2010 | Troennberg | F16H 48/36 475/223 |
| 2011/0269592 | A1* | 11/2011 | Klomp | F16H 48/30 475/1 |
| 2014/0374185 | A1* | 12/2014 | Fischer | B60K 17/30 180/253 |
| 2018/0057048 | A1* | 3/2018 | Joyce | B62D 6/04 |

FOREIGN PATENT DOCUMENTS

| | | |
|---|---|---|
| DE | 112010003590 T5 | 1/2013 |
| DE | 102013213280 A1 | 1/2015 |
| DE | 102014217214 A1 | 3/2015 |
| DE | 102014225490 A1 | 6/2015 |
| EP | 1078831 A2 | 2/2001 |
| EP | 1263633 B1 | 10/2005 |
| JP | 2007230436 A | 9/2007 |

OTHER PUBLICATIONS

International Search Report and Written Opinion dated Jun. 5, 2018 in corresponding International Application No. PCT/EP2018/053446; 28 pages.

International Preliminary Report on Patentability (Chapter I) dated Sep. 12, 2019, in corresponding International application No. PCT/EP2018/053446; 8 pages.

* cited by examiner

SETTING A TORQUE DISTRIBUTION BETWEEN WHEELS OF AN AXLE OF A MOTOR VEHICLE BY ACTUATION OF AN OPERATOR CONTROL UNIT

FIELD

The invention relates to a method for operating a motor vehicle, in which an active manipulation of the yaw angle is performed by an uneven torque distribution on the wheels of at least one axle. The invention moreover relates to a control unit and to a motor vehicle.

BACKGROUND

From the background, systems for torque distribution to multiple wheels of a motor vehicle are known, wherein by the uneven torque distribution among the wheels, a yaw angle of the motor vehicle is actively manipulated. Such methods for torque distribution are also referred to in English as "torque vectoring" or "active yaw." For example, during a cornering of the motor vehicle, by the uneven torque distribution, a higher torque is set on a wheel on the outside of the curve than on a wheel on the inside of the curve. The wheel on the outside of the curve and the wheel on the inside of the curve can be arranged on the same axle. Thereby, for example, a transverse dynamics and/or a steering behavior of the motor vehicle can be improved.

Furthermore, DE 10 2014 225 490 A1 provides a vehicle control method in which a motor torque control and a braking force control occur in cooperation when a vehicle is skidding or spinning. Here, a torque is distributed via a differential mechanism to a left wheel and to a right wheel. For example, an uneven torque distribution between the two wheels is enabled.

According to the background, the intervention in the torque distribution of the vehicle always occurs in an automated manner. This means that for a driver of the motor vehicle, there can be no possibility of influencing the intervention in the torque distribution.

In this context, DE 11 2010 003 590 T5 provides a system for dynamic control of a vehicle. A first input device is designed to set a first group of settable subsystems which influence the performance of the drive train of the vehicle. A second input device is designed to set a second group of settable subsystems which influence the handling of the vehicle. In addition, a vehicle is disclosed, with a system for stability control, which monitors yaw movements of the vehicle by means of a yaw sensor and actuates brakes in a manner dependent on said yaw movements.

SUMMARY

The object of the present invention is to design a torque distribution to the wheels of a motor vehicle, which can be controlled more easily by the driver.

This object is achieved according to the invention by the subjects of the independent claims. Advantageous embodiments with suitable developments are the subjects of the dependent claims.

A first aspect of the invention relates to a method for operating a motor vehicle, in which an active manipulation of the yaw angle of the motor vehicle is performed, in that, on a left wheel and on a right wheel of at least one axle of the motor vehicle, an uneven torque distribution is set. Here, for the left wheel and the right wheel of the at least one axle, a different torque is set in each case. For example, a greater torque is set for the left wheel than for the right wheel. In another example, a greater torque is set for the right wheel than for the left wheel. Advantageously, in a motor vehicle with more than one driven axle, on two or more axles of the motor vehicle, an uneven torque distribution is set on a left wheel and on a right wheel of the respective axle.

The torque which is set in the context of the invention for a respective wheel denotes in particular the torque which is transmitted by the respective wheel to the road. Thus, the torque can be directly proportional to a driving force generated by the wheel. The torque can be composed of a driving torque on the respective wheel and a braking torque on the respective wheel. The driving torque is transmitted in particular by the drive train to the respective wheel. Alternatively or additionally, the driving torque can be generated directly on the wheel by a respective wheel drive, for example, by a wheel hub motor, which is preferably implemented as an electric motor. In this case, the left wheel of the axle and the right wheel of the axle preferably have a respective wheel drive. The braking torque is generated on the wheel in particular by a respective braking unit which can in particular be part of an operated braking system of the motor vehicle. The torque distribution denotes a ratio between the torque on the left wheel of the axle and the torque on the right wheel of the axle.

The left wheel and the right wheel can each comprise a tire which is preferably at least partially made of rubber. The torque is transmitted in particular by the respective wheel, preferably by the respective tire, to a substrate on which the motor vehicle is located, preferably a road. Preferably, by means of the uneven torque distribution, a steering of the motor vehicle is facilitated. In particular, at least on one steerable axle of the motor vehicle, the left wheel and the right wheel are arranged in a steerable manner on the motor vehicle. The wheels of the steerable axle can be steered for steering the motor vehicle. By steering the wheels of the steerable axle, a steering lock angle of the wheels, in particular in a plane parallel to the substrate on which the motor vehicle is located, can be set. In particular, by the uneven torque distribution, a yaw of the motor vehicle is assisted due to the steering lock angle of the wheels of the steerable axle. The steering lock angle of the wheels of the steerable axle is preferably controlled by means of a steering wheel of the motor vehicle.

In order to make it easier then for the driver to control the torque distribution to the wheels of the motor vehicle, it is provided according to the invention that an actuation of an operator control unit of the motor vehicle is detected, the uneven torque distribution is set in a manner dependent on the detected actuation, and the uneven torque distribution is maintained only as long as the actuation of the operator control unit is detected. The actuation of the operator control unit is present in particular while a user, preferably the driver, interacts with the operator control unit. Preferably, the actuation of the operator control unit is present precisely when an operating element of the operator control unit is exposed to an external force which is not brought about in particular by a component of the motor vehicle. Preferably, the operator control unit is operated by the driver of the motor vehicle.

For example, in particular in a manner dependent on the detected actuation, the uneven torque distribution is set precisely when the actuation of the operator control unit is detected. In particular, the uneven torque distribution is set to a predetermined value precisely when the actuation of the operator control unit is detected. For example, the torque distribution is set to a predetermined ratio between the torque on the left wheel of the axle and the torque on the right wheel of the axle. In another example, a predetermined difference between the torque on the left wheel and the torque on the right wheel is set. In this case, the torque on the left wheel can differ by a predetermined difference value from the torque on the right wheel. The uneven torque distribution which is set in a manner dependent on the detected actuation of the operator control unit is preferably maintained only as long as the operator control unit is actuated. For example, the operator control unit comprises a push button. In this case, the actuation can be detected precisely when the push button is depressed. In this example, the uneven torque distribution which is set in a manner dependent on the detected actuation of the operator control unit is set precisely while the push button is exposed to a force or the push button is in a depressed state.

In addition to the uneven torque distribution which is set in a manner dependent on the detected actuation of the operator control unit, the torque distribution can be set in an automated manner. For example, a method for automated torque distribution from the prior art is superposed on the uneven torque distribution which is set in a manner dependent on the detected operation of the operator control unit. Thus, the torque distribution can in addition be set dependent on a driving situation in which the motor vehicle finds itself. The driving situation is described, for example, by a yaw rate of the motor vehicle, a steering angle of the motor vehicle, a speed or an acceleration, in particular along and/or transversely to the driving direction of the motor vehicle. Therefore, it is preferably provided to determine the yaw rate, the steering angle, the speed or the acceleration. The yaw rate describes in particular a temporal change of the yaw angle and/or an angular speed of the motor vehicle about a vertical axis of the motor vehicle.

An embodiment of the present invention provides that the uneven torque distribution is set exclusively in a manner dependent on the detected actuation of the operator control unit. In other words, in this embodiment, no automated intervention in the torque distribution is provided. Thus, the control via the torque distribution can in this case be exerted exclusively via the operator control unit.

The present method is used in particular in a car, preferably in a passenger car. The passenger car can be a sports passenger car, in particular a sports car or a passenger car with a high-power engine, in particular with an engine power of more than 200 hp, 300 hp, 400 hp or 500 hp. The motor vehicle, particularly the passenger car, in particular the sports passenger car, thus enables the driver to have an improved control over the torque distribution to the two wheels of the at least one axle in comparison to the prior art. In addition, the driving enjoyment can be increased by the present method. In particular, during an operation of the motor vehicle on a race track, a particularly dynamic driving operation can be enabled.

A development provides that the uneven torque distribution is set only in a predetermined operating mode of the motor vehicle. For example, in addition to the predetermined operating mode, the motor vehicle has additional operating modes, in which the actuation of the operator control unit affecting direction has no effect on the torque distribution. In other words, in the additional operating modes of the motor vehicle, the torque distribution is not set in a manner dependent on the actuation of the operator control unit. However, in one or more of the additional operating modes it can be provided that the uneven torque distribution on the left wheel and on the right wheel of the at least one axle is set in an automated manner. It is also possible to provide multiple differently different predetermined operating modes, in which the uneven torque distribution is set in a manner dependent on the actuation of the operator control unit. By means of the predetermined operating mode or the predetermined operating modes it is possible, for example to set a particularly sports-appropriate feature for the motor vehicle in comparison to the other operating modes. Thus, the driver of the motor vehicle can take over the control of the torque distribution only in the predetermined operating mode.

A development provides that the uneven torque distribution is set only during cornering of the motor vehicle. For example, the setting of the uneven torque distribution is enabled in a manner dependent on the detected actuation of the operator control unit, only when cornering of the motor vehicle is already present. In particular, in this manner, it can be ensured that the steering of the motor vehicle is only assisted by uneven torque distribution. In other words, a turning of the motor vehicle can be prevented only due to the uneven torque distribution. For example, the fact that the motor vehicle is cornering here is determined on the basis of the steering angle or the acceleration of the motor vehicle transversely to the driving direction. Preferably, the setting of the uneven torque distribution in a manner dependent on the detected actuation of the operator control unit is only enabled when the wheels of the steerable axle have been turned. Alternatively or additionally, the setting of the uneven torque distribution in a manner dependent on the detected actuation of the operator control unit is enabled only when a steering column and/or the steering wheel deviates from a neutral position in which the motor vehicle is driving straight ahead.

A development provides that the uneven torque distribution is set due to uneven braking of the left wheel and of the right wheel. For example, a driving torque of identical magnitude is transmitted to the left wheel and to the right wheel. Due to the uneven braking of the left wheel and of the right wheel and/or due to the generation of an uneven braking torque on the left wheel and on the right wheel, a different torque can be set on the left wheel and on the right wheel. In particular, the torque of a respective wheel results from the difference between the driving torque and the respective braking torque. Thereby, the uneven torque distribution can be set in a particularly simple manner, since, preferably, only an actuation of respective brakes is necessary for setting the uneven torque distribution.

A development of the invention provides that the uneven torque distribution is set due to uneven distribution of a motor force to the two wheels. For example, the motor force from an engine of the motor vehicle is distributed by a differential and/or an arrangement of clutches unevenly on the two wheels. Alternatively, a separate motor, in particular the wheel drive, can be associated with each one of the two wheels. The uneven distribution of the motor force over the two wheels can in this case be carried out by different actuation of the separate motors. In particular, the separate motors are actuated in such a manner that they generate a respective torque of different magnitude. Preferably the separate motors are wheel hub motors, which are implemented in particular as electric motors.

A development provides that, during the actuation of the operator control unit, an actuation force is detected, and the torque distribution between the two wheels is set to be more uneven, the greater the detected actuation force is. In other words, an unevenness of the torque distribution between the wheels can be set in a manner dependent on the actuation force during the actuation of the operator control unit. In particular the force to which the operating element of the operator control unit is exposed is detected as the actuation force. For example, the actuation force is the force with which the user, in particular the driver, actuates the operator control unit. The actuation force can be measured by a force meter. Preferably, the ratio between the torque on the left wheel and the torque on the right wheel is set to be more uneven, the greater the actuation force is. In this manner, the manual controllability of the torque distribution between the wheels can be further increased.

A development provides that, during the actuation of the operator control unit, an operating path is detected, and the torque distribution between the two wheels is set to be more uneven, the greater the detected operating path is. In other words, an unevenness of the torque distribution between the wheels can be set in a manner dependent on the actuation path during the actuation of the operator control unit. As actuation path, in particular a deflection and/or a stroke of the operator control unit during the actuation is detected. For example, the actuation path is a path length by which the user, in particular the driver, deflects the operating element of the operator control unit. The actuation path can be measured on the operator control unit by a measurement unit. Preferably, the ratio between the torque on the left wheel and the torque on the right wheel is set to be more uneven, the greater the actuation path is. In this manner, the manual controllability of the torque distribution between the wheels can be further increased.

A development provides that the operator control unit comprises a first operating element arranged on the left on the steering wheel, and a second operating element arranged on the right on the steering wheel, and the independent torque distribution is set in a manner dependent on whether the first operating element or the second operating element is actuated. For example, if the torque on the left wheel is set to a higher value than the torque on the right wheel when the second operating element is actuated. For example, the torque on the right wheel is set to a higher value than the torque on the left wheel, when the first operating element is actuated. In another embodiment, the assignment of the operating elements mentioned above can be switched. In this manner, the user's manual controllability of the torque distribution between the wheels can be further increased. In addition, a targeted turning of the motor vehicle, due to the uneven torque distribution between the wheels, is possible. In particular, the targeted turning of the motor vehicle, due to the uneven torque distribution, can in this manner already occur before a steering lock angle of the steering wheel.

A second aspect of the invention relates to a control unit for controlling a drive train of a motor vehicle. By the control unit, an active manipulation of the yaw angle of the motor vehicle can be carried out. The control unit is designed to set an uneven torque distribution on a left wheel and on a right wheel of at least one axle of the motor vehicle. For example, the setting of the uneven torque distribution by the control unit occurs by means of a control signal. For example, a control unit is designed to set a torque for the left wheel and a torque for the right wheel to a respective value on the basis of the control signal from the control unit. The control unit can comprise, for example, a braking device with respective brakes for the left wheel and the right wheel. The actuating unit can comprise alternatively or additionally a differential gear and/or respective clutches for distributing the motor force to the left and the right wheels.

In order to achieve the object according to the invention, the control unit is configured to detect an actuation of an operator control unit of the motor vehicle, to set the uneven torque distribution in a manner dependent on the detected actuation and to maintain it only as long as the actuation of the operator control unit is detected. In particular, the control unit is configured to detect the actuation of the operator control unit of the motor vehicle by receiving an actuation signal from the operator control unit. For example, the control unit is configured to output the control signal in a manner dependent on the actuation signal.

A third aspect of the invention relates to a motor vehicle with the above-mentioned control unit and with an operator control unit which is designed to transmit an actuation signal to the control unit. In particular, the control unit is configured to set the uneven torque distribution in a manner dependent on the actuation signal.

The motor vehicle is, in particular, a car, in particular a passenger car. The passenger car can be a sports passenger car, in particular a sports car or a passenger car with a high-power engine, in particular with an engine power of more than 200 hp, 300 hp, 400 hp or 500 hp.

The invention also covers developments of the motor vehicle according to the invention and of the control unit according to the invention, which comprise features as already described in connection with the developments of the method according to the invention. For this reason, the corresponding developments of the motor vehicle according to the invention and of the control unit according to the invention are not described again here.

BRIEF DESCRIPTION OF THE FIGURES

Below, embodiment examples of the invention are described.

DETAILED DESCRIPTION

Figure 1:
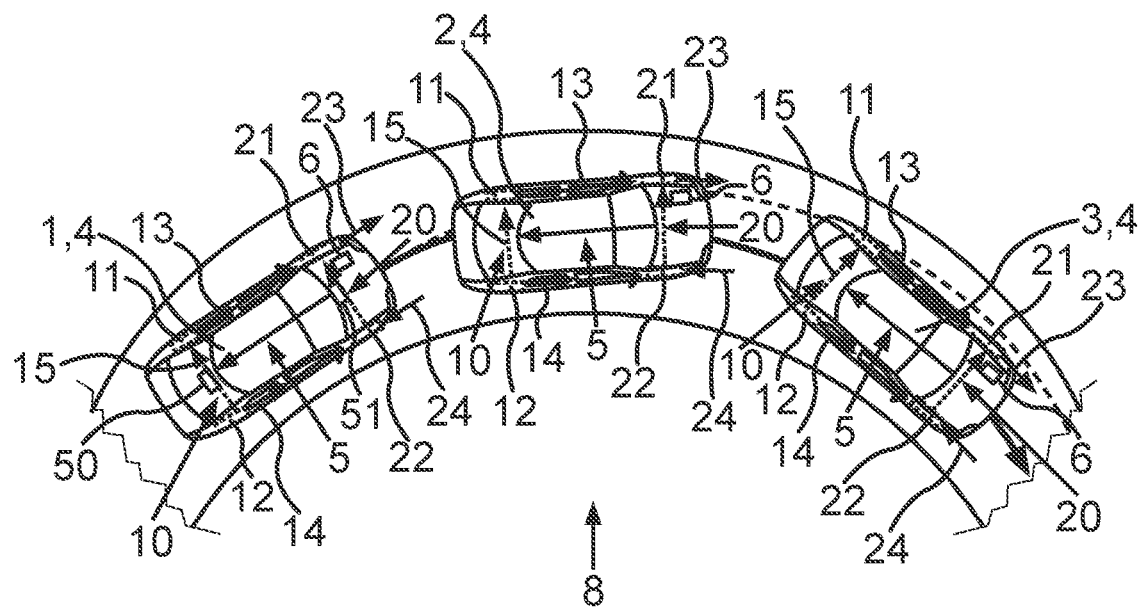
FIG. 1 shows, in a diagrammatic top view, a vehicle driving through a curve.

The embodiment examples explained below are preferred embodiments of the invention. In the embodiment examples, the described components of the embodiments in each case individually represent features of the invention to be considered independently of one another, which in each case also further develop the invention and thus should also be considered as part of the invention individually or in a combination other than the combination shown. Moreover, the described embodiments can also be completed by others of the already described features of the invention.

In the figures, functionally equivalent elements are provided in each case with the same reference numerals.

FIG. 1 shows a motor vehicle 4 while driving through a curve 8 in different positions 1, 2, 3, in which the motor vehicle 4 is located successively as it drives through the curve. The motor vehicle 4 in the present case comprises a left wheel 21 and a right wheel 22 on a front axle 20, as well as a left wheel 11 and a right wheel 12 on a rear axle 10. The motor vehicle 4 comprises a drive system 5 which, in the present case, provides an all-wheel-drive for the motor vehicle 4. In particular, both the front axle 20 and also the rear axle 10 of the motor vehicle 4 are driven. By means of the drive system 5, a motor force of an engine of the motor vehicle 4 is transmitted to the driven wheels, in the present case the left wheel 11, the left wheel 21, the right wheel 12 and the right wheel 22. By the drive force of the engine a respective driving torque is generated on each of the wheels 11, 12, 21, 22.

In the present case, an actuating unit 51 is arranged on the front axle 20. In the present case, an actuating unit 50 is arranged on the rear axle 10. By means of the actuating unit 50, an uneven torque distribution for the left wheel 11 and for the right wheel 12 of the rear axle can be set. For example, the actuating unit 50 comprises a differential, in particular a limited slip differential, a respective clutch for the left wheel 11 and for the right wheel 12 and/or a respective braking unit. A torque distribution between the left wheel 11 and the right wheel 12 can be set, for example, by opening, allowing slipping or closing of the respective clutches for the left wheel 11 and for the right wheel 12. Alternatively or additionally, the torque distribution between the left wheel 11 and the right wheel 12 can be set by generating a respective braking torque on the left wheel 11 and/or the right wheel 12. The actuating unit 51 can be implemented analogously to the actuating unit 50.

From the respective driving torque and the respective braking torque, a respective torque results on each of the wheels 11, 12, 21, 22. In particular, the respective torque results from the difference between the respective driving torque and the respective braking torque. The respective torque can be transmitted by each of the wheels 11, 12, 21, 22 to a substrate on which the motor vehicle 4 is located and thereby generate a driving force or braking force for the motor vehicle 4. In particular, each of the wheels 11, 12, 21, 22 comprises a tire which is made in particular from rubber and which is in a frictional connection with the substrate.

When driving through the curve 8, a cornering of the motor vehicle 4 detected by measuring a steering lock angle on the left wheel 21 and on the right wheel 22 of the front axle 20. Alternatively or additionally, the cornering of the motor vehicle 4 can be determined by measuring a steering lock angle or steering angle of a steering wheel 7 of the motor vehicle 4. In particular, the steering angle on the left wheel 21 and on the right wheel 22 of the front axle 20 is set by the steering wheel 7. A driver of the motor vehicle 4 can thus influence the steering lock angle on the left wheel 21 and on the right wheel 22 by turning the steering wheel 7. Thereby, in particular, a steering of the motor vehicle 4 is possible.

The motor vehicle 4 comprises, in the present case, a control unit 6, by means of which an active manipulation of a yaw angle of the motor vehicle 4 can be carried out by setting an uneven torque distribution between the left wheel 11 and the right wheel 12 on the rear axle 10. Alternatively or additionally, the yaw angle of the motor vehicle 4 can be manipulated by setting an uneven torque distribution between the left wheel 21 and the right wheel 22 on the front axle 20. In particular, the control unit 6 for this purpose transmits a control signal to the respective actuating unit 50, 51. The actuating unit 50 can set a respective torque for the left wheel 11 and the right wheel 12, in a manner dependent on the control signal. The control unit 51 can set a respective torque for the left wheel 21 and the right wheel 2 and 20 in a manner dependent on the control signal.

Figure 2:
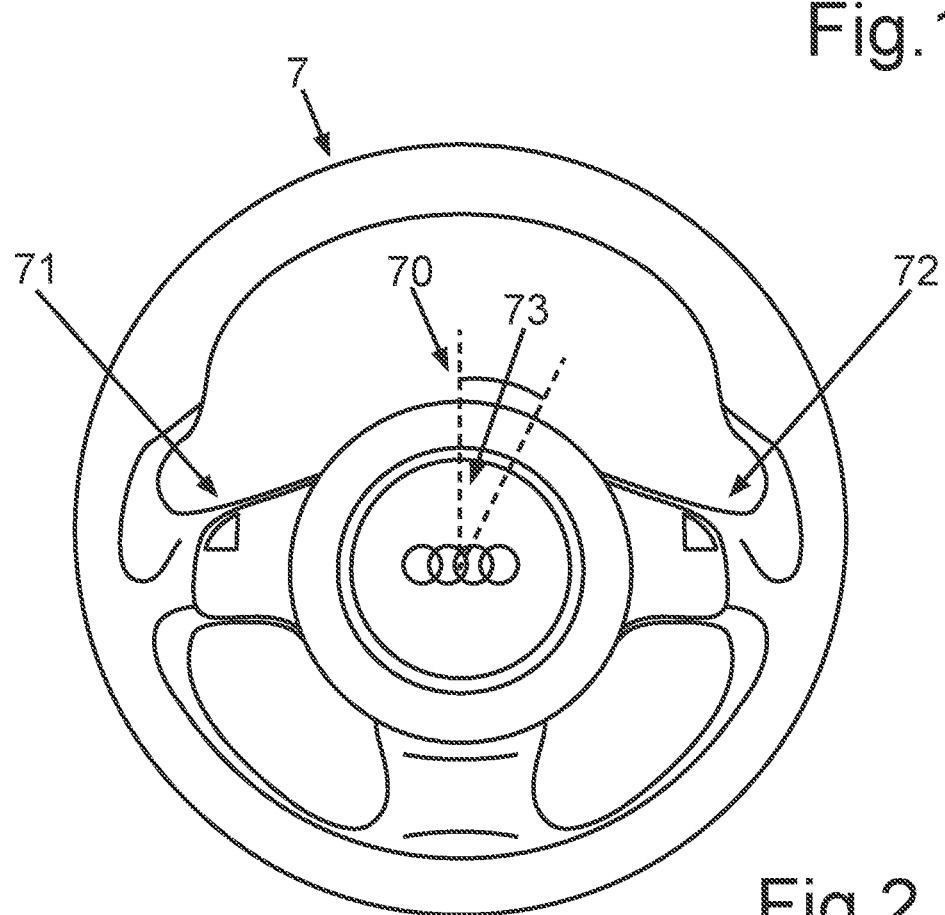
FIG. 2 shows, in a diagrammatic front view, a steering wheel for a motor vehicle with an operator control unit.

FIG. 2 shows the steering wheel 7 which comprises an operator control unit 70. The operator control unit 70, in the present case, comprises a first operating element 71 and a second operating element 72. The first operating element 71 can be arranged on the left on the steering wheel 7, and the second operating element 72 can be arranged on the right on the steering wheel. In the present case, the operating elements 71, 72 are implemented as push buttons. In other embodiments, the operating elements 71, 72 can be implemented as levers, in particular on a back side of the steering wheel 7 facing away from the driver, preferably in the manner of switches.

The control unit 6 detects an actuation of the operator control unit 70 or of one of the operating elements 71, 72. In particular, the operator control unit 70 transmits an actuation signal to the control unit 6, wherein the actuation of the operator control unit 70 can be characterized by the actuation signal. In particular, the operator control unit 70 transmits the actuation signal to the control unit 6 precisely when one of the operating elements 71, 72 is exposed to an actuation force. Preferably, the actuation signal characterizes which of the operating elements 71, 72 is actuated.

The control unit 6 sets the uneven torque distribution 15 between the left wheel 11 and the right wheel 12 on the rear axle 10, in the present case, in a manner dependent on the actuation of the operator control unit 70. The control unit 6 sets the uneven torque distribution between the left wheel 21 and the right wheel 22 on the front axle 20, in the present case, in a manner dependent on the actuation of the operating element 70. In particular, for the torque on the left wheel 11, the control unit 6 sets a higher value than for the torque on the right wheel 12 precisely when the second operating element 72 is actuated. In particular, for the torque on the right wheel 12, the control unit 6 sets a higher value than for the torque on the left wheel 11 precisely when the first operating element 71 is actuated. Depending on the preference of a user of the motor vehicle 4, the assignment of the operating elements 71, 72 can be switched. A control of the torque distribution between the left wheel 21 and the right wheel 22 on the front axle can occur analogously to and/or at the same time as the control of the torque distribution 15 between the left wheel 11 and in the right wheel 12 on the rear axle 10.

For example, the torque distribution 15 between the left wheel 11 and the right wheel 12 is set to a predetermined ratio during the actuation of the operator control unit 70. In particular, the ratio between the torque on the left wheel 11 and on the right wheel 12 is set to a predetermined value during the actuation of the operator control unit 70. Alternatively, the torque on the left wheel 11 and on the right wheel 12 can be set to a predetermined difference. In other words, a value for the torque on the left wheel 11 differs by the predetermined difference from the value for the torque on the right wheel 12.

Alternatively, the ratio between the torque on the left wheel 11 and in the right wheel 12 can be set in a manner dependent on a driving situation in which the motor vehicle 4 finds itself. For example, the driving situation in which the motor vehicle 4 finds itself can be characterized by a steering angle, a yaw rate, a speed and/or an acceleration. Preferably, one or more of the above-mentioned values are determined for setting the ratio between the torque on the left wheel 11 and the torque on the right wheel 12.

In the present case, the uneven torque distribution 15 on the rear axle 10 and/or the uneven torque distribution on the front axle 20 is/are set in a manner dependent on the detected actuation precisely when the actuation of the operating element 70 is detected. In other words, the uneven torque distribution 15 on the rear axle 10 and/or the uneven torque distribution on the front axle 20 in a manner dependent on the detected actuation is/are maintained only as long as the actuation of the operator control unit 70 is detected.

The control unit 6 can moreover be designed for setting the uneven torque distribution on the front axle 20 and/or the rear axle 10 in a manner dependent on the actuation of the operator control unit 70 and also for an automated setting of the uneven torque distribution on the front axle 20 and/or the rear axle 10. In this case, the automated setting of the uneven torque distribution and the setting of the uneven torque distribution in a manner dependent on the detected actuation of the operator control unit 70 can be superposed.

An actuation force and/or an actuation stroke can be determined during the actuation of the operator control unit 70. For example, an actuation force with which the user of the motor vehicle 4 actuates one of the operating elements 71, 72 is determined. Alternatively or additionally, it can be determined how strong the user deflects one of the operating elements 71, 72. The unevenness of the torque distribution 15 between the left wheel 11 and the right wheel 12 can be set in a manner dependent on the actuation force and/or the actuation stroke. In particular, the ratio between the torque on the left wheel 11 and the right wheel 12 can be set in a manner dependent on the actuation force and/or the actuation stroke.

Preferably, the motor vehicle 4 comprises multiple operating modes. For example, during the actuation of the operator control unit 70, in a first of the multiple operating modes, the uneven torque distribution 15 is set in a manner dependent on the detected actuation. For example, in a second of the multiple operating modes, the uneven torque distribution 15 is set exclusively in a manner dependent on the detected actuation. For example, in a third of the multiple operating modes, the uneven torque distribution 15 is set both in a manner dependent on the detected actuation of the operator control unit 70 and also in an automated manner, for example, controlled according to a characteristic diagram or input variables. For example, in a fourth of the multiple operating modes, the uneven torque distribution 15 is not set in a manner dependent on the actuation of the operator control unit 70. In particular, the operator control unit 70 in the fourth of the multiple operating modes is thus not in operation.

Overall, the examples show how by means of the invention a torque distribution to the wheels of a motor vehicle can be designed in a manner so it can be controlled better by a driver.

The invention claimed is:

1. A method for operating a motor vehicle, in which an active manipulation of the yaw angle of the motor vehicle is performed, in that, on a left wheel and on a right wheel of at least one axle of the motor vehicle, an uneven torque distribution is set,
    wherein an actuation of an operator control unit of the motor vehicle is detected;
    wherein the uneven torque distribution is set in a manner dependent on the detected actuation;
    wherein the uneven torque distribution is maintained only as long as the actuation of the operator control unit is detected; and
    wherein the uneven torque distribution is superimposed over a separate, automated uneven torque distribution set by the motor vehicle.

2. The method according to claim 1, wherein the uneven torque distribution is set only in a predetermined operating mode of the motor vehicle.

3. The method according to claim 2, wherein the uneven torque distribution is set only during cornering of the motor vehicle.

4. The method according to claim 2, wherein during the actuation of the operator control unit, an actuation force is detected, and the torque distribution between the two wheels is set more unevenly the greater the detected actuation force is.

5. The method according to claim 2, wherein during the actuation of the operator control unit, an actuation path is detected, and the torque distribution between the two wheels is set more unevenly the greater the detected actuation path is.

6. The method according to claim 1, wherein the uneven torque distribution is set only during cornering of the motor vehicle.

7. The method according to claim 6, wherein during the actuation of the operator control unit, an actuation force is detected, and the torque distribution between the two wheels is set more unevenly the greater the detected actuation force is.

8. The method according to claim 1, wherein the uneven torque distribution is set by uneven braking of the left wheel and of the right wheel.

9. The method according to claim 8, wherein during the actuation of the operator control unit, an actuation force is detected, and the torque distribution between the two wheels is set more unevenly the greater the detected actuation force is.

10. The method according to claim 1, wherein the uneven torque distribution is achieved by unevenly distributing a motor power between the wheels.

11. The method according to claim 10, wherein the motor power is unevenly distributed through a differential gear and/or a clutch provided for each of the left and right wheels.

12. The method according to claim 10, wherein the motor power is unevenly distributed through provision of a separate motor for each of the left and right wheels.

13. The method according to claim 10, wherein during the actuation of the operator control unit, an actuation force is detected, and the torque distribution between the two wheels is set more unevenly the greater the detected actuation force is.

14. The method according to claim 1, wherein during the actuation of the operator control unit, an actuation force is detected, and the torque distribution between the two wheels is set more unevenly the greater the detected actuation force is.

15. The method according to claim 1, wherein during the actuation of the operator control unit, an actuation path is detected, and the torque distribution between the two wheels is set more unevenly the greater the detected actuation path is.

16. The method according to claim 1, wherein the operator control unit comprises a first operating element arranged on the left on a steering wheel and a second operating element arranged on the right on the steering wheel, and
    the uneven torque distribution is set in a manner dependent on whether the first operating element or the second operating element is actuated.

17. A control unit for controlling a drive train of a motor vehicle, by which an active manipulation of the yaw angle of the motor vehicle can be performed,
    wherein the control unit is designed to set an uneven torque distribution on a left wheel and on a right wheel of at least one axle of the motor vehicle,
    wherein the control unit is configured to detect an actuation of an operator control unit of the motor vehicle, to set the uneven torque distribution in a manner dependent on the detected actuation, and to maintain the uneven torque distribution only as long as the actuation of the operator control unit is detected, and
    wherein the control unit is configured to superimpose the uneven torque distribution over a separate, automated torque distribution set by the control unit.

18. The control unit according to claim 17, wherein the uneven torque distribution is achieved by unevenly distributing a motor power between the wheels.

19. The control unit according to claim 18, wherein the motor power is unevenly distributed through a differential gear and/or a clutch provided for each of the left and right wheels.

20. The control unit according to claim 18, wherein the motor power is unevenly distributed through provision of a separate motor for each of the left and right wheels.

* * * * *